United States Patent Office 2,816,085
Patented Dec. 10, 1957

2,816,085
MODIFIED PHENOLIC RESIN COMPOSITIONS

Thomas Anas, Springfield, and Stuart H. Rider, Longmeadow, Mass., assignors to Monsanto Chemical Company, St. Louis, Mo., a corporation of Delaware No Drawing. Application March 16, 1954,
Serial No. 416,694

7 Claims. (Cl. 260—45.1)

This invention relates to modified phenolic resin compositions. More particularly, this invention relates to blends of permanently fusible phenolic resins with non-alkylated triazine-type compounds.

In the past, it has been proposed to blend alkylated derivatives of melamine with permanently fusible phenolic resins in order to improve the hardness, arc resistance, fire resistance, alkali resistance, etc. thereof. Although compositions of this nature have proved to be generally satisfactory, blends of permanently fusible phenolic resins with non-alkylated melamine derivatives have not proved to be entirely satisfactory in one respect or another, particular difficulty having been encountered due to the incompatibility of the non-alkylated triazine derivatives with permanently fusible phenolic resins.

Accordingly, an object of the present invention is the provision of modified phenolic resin compositions having improved physical properties.

Another object is the provision of compositions comprising blends of permanently fusible phenolic resins with compatible non-alkylated triazine-type materials.

These and other objects are attained by blending benzoguanamine, phenyl acetoguanamine or methylol derivatives thereof with a permanently fusible phenolic resin having a melting point of at least about 85° C.

The following examples are given by way of illustration and are not intended as limitations on the scope of this invention. Where parts are mentioned, they are parts by weight.

EXAMPLE I

*Preparation of permanently fusible phenolic resin "A"*

Add about 100 parts of phenol and about 0.3 part of an aqueous 93% solution of hydrochloric acid to about 65 parts of a 37% aqueous solution of formaldehyde. Form a condensation product by heating this solution with agitation at a temperature of about 90° C. under 10″ of vacuum until the reaction has gone to substantial completion. Recover the resin, dry and grind to a fine powder. The phenolic resin thus prepared will be permanently fusible and will have a melting point of about 85° C.

EXAMPLE II

*Modification of phenolic resin "A"*

Blend about 5 parts of powdered benzoguanamine with about 100 parts of the phenolic resin "A". Heat the mixture to a temperature of about 90° C. with agitation and then cool and grind the same. Mix about 10 parts of hexamethylene tetramine with the powdered mixture, heat the resultant blend to about 90° C. to form a liquid composition and cast films of the liquid on glass plates. Bake the films for about 15 minutes at 150° C. The thus-prepared films are hard, clear and slightly yellow in color, indicating that the benzoguanamine is compatible with the phenolic resin.

When 5 parts of melamine or phenyl melamine are substituted for the benzoguanamine and the experiment is otherwise repeated in the described manner, the resultant films are cloudy and opaque, thus indicating that the melamine and phenyl melamine are incompatible with the phenolic resin.

Clear films are obtained when 100 parts of benzoguanamine are blended with 100 parts of phenolic resin in the above-described manner and also when 75 parts of phenyl acetoguanamine are thus blended with 100 parts of phenolic resin. The results are summarized in the following table.

TABLE I

*Compatibility of triazines with permanently fusible phenolic resins*

| Composition | Phenolic Resin (Parts) | Triazine | Parts | Compatibility |
|---|---|---|---|---|
| 1 | 100 | Melamine | 5 | incompatible. |
| 2 | 100 | Phenyl Melamine | 5 | Do. |
| 3 | 100 | Benzoguanamine | 5 | compatible. |
| 4 | 100 | ...do | 100 | Do. |
| 5 | 100 | Phenyl acetoguanamine | 75 | Do. |

EXAMPLE III

*Preparation of permanently fusible phenolic resin "B"*

Add about 100 parts of phenol and 0.3 part of an aqueous 93% solution of hydrochloric acid to 69 parts of a 37% aqueous solution of formaldehyde. Form a condensation product by heating this solution at a temperature of about 90° C. with agitation under 10″ of vacuum until the reaction has gone to substantial completion. Recover the resin, dry and grind. The thus-prepared phenolic resin will be permanently fusible and will have a melting point of about 100° C.

EXAMPLE IV

*Modification of phenolic resin "B"*

Blend about 75 parts of powdered dimethylol derivative of benzoguanamine with 100 parts of the powdered phenolic resin "B", heat the blend to a temperature of about 125° C. to liquefy the same, and then cast films of the liquid material on glass plates. The films are cured when heated for about 15 minutes at a temperature of 150° C. It is found that the cured film is hard, clear and slightly yellow, indicating that the dimethylol derivative is compatible with the phenolic resin.

The mono-, tri- and tetramethylol derivates of benzoguanamine are also compatible with the permanently fusible phenolic resin, as are the mono-, di-, tri- and tetramethylol derivatives of phenyl acetoguanamine. Thus, when the dimethylol derivative of benzoguanamine of Example IV is replaced with an equal amount by weight of the tetramethylol derivative of benzoguanamine or the trimethylol derivative of phenyl acetoguanamine and the example is otherwise repeated in the described manner, films are obtained which are hard, clear and slightly yellow, indicating that the methylol derivatives are compatible with the phenolic resin. However, when the dimethylol derivative of benzoguanamine is replaced by an equal amount by weight of a methylol derivative of melamine, such as trimethylol melamine, and Example IV is otherwise repeated in the described manner, the resultant films are cloudy and opaque. This shows that the methylol melamines are incompatible with the phenolic resin. The results are summarized in the following table.

TABLE II

*Compatibility of triazine methylol derivatives with permanently fusible phenolic resins*

| Composition | Phenolic Resin (Parts) | Methylol Derivative | Parts | Compatibility |
|---|---|---|---|---|
| 6 | 100 | Trimethylol Melamine | 75 | Incompatible. |
| 7 | 100 | Dimethylol Derivative of Benzoguanamine. | 75 | Compatible. |
| 8 | 100 | Tetramethylol Derivative of Benzoguanamine. | 75 | Do. |
| 9 | 100 | Trimethylol derivative of Phenyl acetoguanamine. | 75 | Do. |

The phenolic resins to be used in accordance with the present invention are permanently fusible resins having a melting point of about 85° C. or higher, numerous examples of which are known to those skilled in the art. Such resins can be prepared, for example, by reacting 1 mol of phenol with from about 0.65 to 0.95 mol of formaldehyde under acid conditions. Up to 50% of the phenol may be replaced by molecularly equivalent amounts of one or more mono- or polyhydroxy phenolic compounds such as cresols, xylenols, naphthols, resorcinol, phlorglucinol, etc. All or part of the formaldehyde may be replaced by an equivalent amount of a polymer thereof such as paraformaldehyde, trioxymethylene, etc.

Permanently fusible phenolic resins of this nature are compatible with benzoguanamine, phenyl acetoguanamine and methylol derivatives thereof. Generally speaking, not more than about 100 parts of guanamine or methylol derivative should be blended with each 100 parts of phenolic resin if compatibility is to be preserved. In order to improve hardness, arc resistance, fire resistance, alkali resistance, etc., it is generally necessary to utilize at least about 5 parts of guanamine or methylol derivative thereof per 100 parts of phenolic resin.

When the phenolic resin is blended with phenyl acetoguanamine or benzoguanamine, it is necessary to utilize a suitable hardening agent usch as hexamethylene tetramine, paraformaldehyde, etc. in order to cure the composition. The amount of hardening agent to be used in this situation should be sufficient to set and harden the composition. However, when the di, tri or tetramethylol derivatives of benzoguanamine or phenyl acetoguanamine are used, it is not necessary to use a hardening agent.

The compositions of the present invention may be modified through the addition of various conventional additives such as fillers, colorants, lubricants, mold release agents, etc., and may be used in dry powdered form or, if desired, may be used in the form of aqueous or organic solvent solutions. The compositions are useful for a wide variety of purposes such as the preparation of molding powders, grinding wheels, laminating resins, coating compositions, electrical insulating materials, etc.

What is claimed is:

1. A composition consisting of a blend of (1) 100 parts of a permanently fusible condensation product of 0.65–0.95 mol of formaldehyde with 1 mol of a member of the group consisting of phenol and mixtures thereof with up to 50% of its weight of a member of the group consisting of cresols, xylenols, naphthols, resorcinol and phloroglucinol, said fusible condensation product having a melting point of at least 85° C. and (2) 5 to 100 parts of a guanamine compound taken from the group consisting of benzoguanamine, phenyl acetoguanamine and the N-methylol derivatives thereof.

2. A composition as in claim 1 wherein the guanamine compound is an N-methylol derivative of benzoguanamine.

3. A composition as in claim 1 wherein the guanamine compound is an N-methylol derivative of phenyl acetoguanamine.

4. A composition as in claim 1 wherein the guanamine compound is benzoguanamine.

5. A composition as in claim 4 containing, additionally, a hardening agent present in an amount sufficient to set and harden the blend.

6. A composition as in claim 1 wherein the guanamine compound is phenyl acetoguanamine.

7. A composition as in claim 6 containing, additionally, a hardening agent present in an amount sufficient to set and harden the blend.

References Cited in the file of this patent

UNITED STATES PATENTS

| 2,197,357 | Widmer et al. | Apr. 16, 1940 |
| 2,387,256 | Groten | Oct. 23, 1945 |
| 2,432,544 | Rhodes | Dec. 16, 1947 |
| 2,466,399 | Dunlop | Apr. 5, 1949 |

FOREIGN PATENTS

| 905,649 | France | Apr. 23, 1945 |